No. 769,832.                                        Patented September 13, 1904.

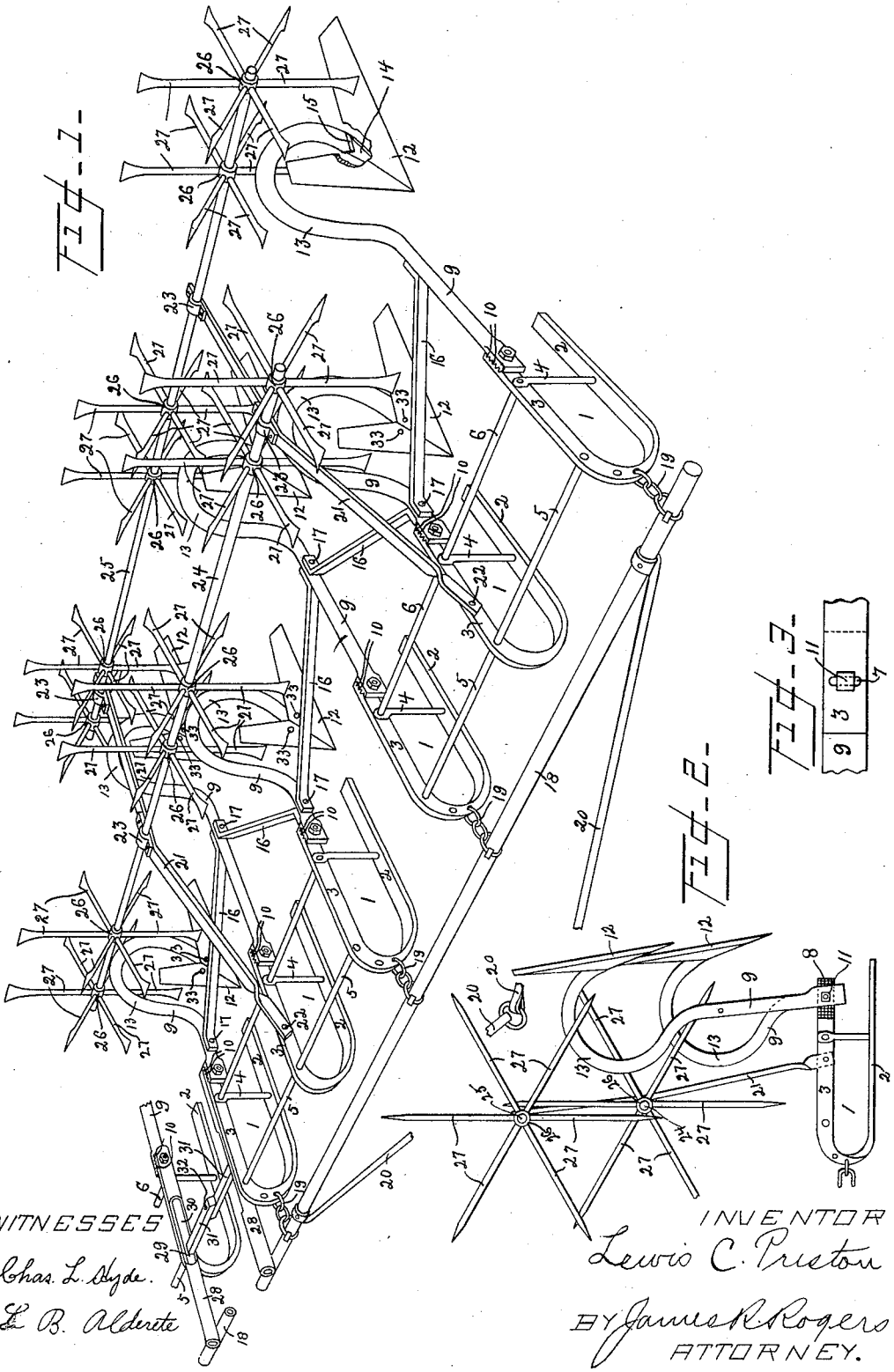

UNITED STATES PATENT OFFICE.

LEWIS C. PRESTON, OF WESTON, OREGON.

COMBINED WEED-CUTTER AND CULTIVATOR.

SPECIFICATION forming part of Letters Patent No. 769,832, dated September 13, 1904.

Application filed October 28, 1901. Serial No. 80,332. (No model.)

*To all whom it may concern:*

Be it known that I, LEWIS C. PRESTON, a citizen of the United States, residing at Weston, in the county of Umatilla and State of Oregon, have invented a new and useful Combined Weed-Cutter and Cultivator, of which the following is a specification.

This invention relates to agricultural implements, and particularly to implements constructed to cultivate the soil and remove vegetable growth therefrom; and some of the objects of this invention are to provide an implement of this character which will be simple and cheap in construction and at the same time efficient in operation.

Another object of the invention is to construct an implement in such a manner that the share or blade will travel through the soil with the nose or point and the heels or ends in the same plane and the heels prevented from rising and the edges of the blade slanting outwardly and downwardly to facilitate the action of the blade.

It is also an object of this invention to construct the blade or share quite broad where the same is subjected to the most wear and to support and brace the same respectively upon an extension and against a shoulder or shoulders of the beam.

Another object of the invention is to construct an implement to depress and hold down the vegetable growth until the blades or shares shall have passed therebeyond, which part of the implement will be operated by the passage over or through the soil.

Furthermore, an object of this invention is to provide an implement wherein the operative parts may be elevated at any angle and retained in that position during the transportation of the implement and the plane of operation thereof can be readily varied.

A further object is to provide a skeleton runner constructed of a single piece of metal in order to afford lightness and ease of draft.

With these and other objects in view the invention consists, essentially, in the construction, combination, and arrangement of parts, substantially as more fully described in the following specification, and illustrated in the accompanying drawings, forming part of this application, in which—

Figure 1 is a perspective view of an implement constructed in accordance with my invention, showing part of the second section of the implement broken away, as well as the draft devices. Fig. 2 is a side elevational view of a portion of the implement, illustrating the position of the operative parts when elevated for transportation; and Fig. 3 is an enlarged detail view of the adjustable connection employed.

Similar characters of reference designate corresponding parts throughout the several views.

The drawings illustrate one complete section of the implement, together with a portion of another section similar in construction to that completely illustrated, said sections being shown connected by my improved coupling, which may unite any preferred number of sections; and it will be understood that the invention is not limited to the number of sections employed, as only one section will be specifically described herein.

Referring to the drawings, the reference character 1 designates a sliding portion or runner, preferably constructed in skeleton form and of a single piece of metal, the part 2 whereof is formed with its widest portion to travel upon the soil or surface over which the implement is drawn, and the part 3 of the runner is desirably formed so that the widest portion thereof will lie in a vertical plane or in a plane at right angles to the width of the part 2, said parts preferably extending parallel to each other, substantially as illustrated in the drawings.

By preference the parts or members 2 and 3 of the runner are connected by a post or rod 4 to retain the parts of the runner in a desired position, and brace rods or bars 5 and 6 may pass through the member or part 3 of the runners to unite any number thereof (preferably three) together, and the bar 6 may pass through one end of the posts 4, substantially in the manner illustrated.

The part 3 of the runner is preferably slotted transversely, substantially as illustrated at 7 in Fig. 3 of the drawings, and this part is desirably provided with longitudinal and transverse serrations or grooves, as at 8, Fig. 2, by means of which construction the beams 9, which are preferably provided with similar serrations or grooves 10, may be adjustably connected with the runners by means of a bolt or other device 11, whereby the beams may be elevated into the position shown in Fig. 2 for transportation or into any other angle in relation to the runners, and the depth of the shares or blades 12 carried by said beam can be regulated by changing the engagement of the beam in the longitudinal grooves of the runner.

The beams 9 are preferably curved or bowed, as shown at 13, and the extremity is cut away and inclined laterally and forwardly, as at 14, Fig. 1, and shoulders 15 are formed upon the curved portion of the beam to receive and support the blades 12, which are preferably inclined downwardly, from their attachment to the beam, substantially as illustrated in Fig. 2 of the drawings. By means of this construction the center of the shares or blades are preferably concaved at the attachment with the point 14 of the beams, and the outer edges of the blades are depressed and the inner edges thereof are elevated; also, the heels or large ends of the blades are desirably inclined downwardly or depressed slightly.

In order to afford additional rigidity to the beam 9, diagonal or curved braces 16 may be employed and may be secured by rivets or bolts 17, to the beams, substantially as illustrated in Fig. 1 of the drawings, whereby the beams and shares or blades are retained in proper relative position and are prevented from being deflected during the passage of the blade through the soil. However, these braces may be omitted, if desired.

A draft device may be employed, preferably consisting of a tubular bar 18, which may be connected with every runner or with every alternate runner by means of links 19, and rods 20 may be connected with the draft-bar and with a ring or other device 34 to afford connection with a spreader or doubletree in the usual manner to provide for the attachment of the draft-animals, as will be readily understood, and by constructing the draft-bar 18 in the manner described great strength will be combined with lightness.

Plates or bars 21 may be movably connected with the part 3 of the runners by a bolt or other device 22, whereby the plates or bars 21 may be moved into any position in relation to the runners—as, for instance, into the position shown in Fig. 2 of the drawings, which is the one found preferable during the transportation of the implement—and said bars are desirably bent slightly, as shown, and are provided with bearings 23 to receive revoluble shafts 24 and 25, preferably carrying hubs 26, supporting arms or blades 27, preferably constructed with flattened or flared extremities, substantially as shown in Fig. 1 of the drawings. By means of this construction the arms or blades 27 are movable collectively by the elevation or depression of the plates or bars 21, and when in operative position the extremities of the arms or blades 27 rest upon the soil over which the implement is being drawn and they are rotated by contact therewith, the function of said arms being to hold down or depress weeds, stubble, or other vegetable growth while the blades pass therebeyond and to prevent the choking of the blades or shares thereby, which action is facilitated by the curved portions of the beams, which decreases the liability of the implement to become choked.

When it is desired to connect two sections of the implement, the outside runner of each section is preferably provided with a guideway or cylindrical extension 28, having a slot 29, and slidably mounted within said extension is a bar or rod 30, carrying an arm 31, moving in said slot, and the free end of the arms 31 are preferably pivotally connected, as shown at 32 in Fig. 1 of the drawings, and by means of this construction one section of the implement may be moved in advance of the other without changing the course or impairing the efficiency of the implement, as the bar or rod 30 will slide toward the forward end of the slot 29 of the section in the rear, substantially as indicated in Fig. 1 of the drawings, while the bar or rod 31 upon the opposite section will approach the rear end of the slot 29 of that section, and at the same time said bars or rods will articulate in respect to each other to further accommodate the different sections.

This invention may be embodied in several sections, and the draft-animals attached to one section may be driven faster than those of the other sections, which would result in the twisting or irregularity in the course of the implement and the impairment of the operation thereof; but by means of the improved coupling just described one section may be drawn more rapidly than the other without changing the course of the implement or lessening its efficiency, as will be readily understood.

The arms or blades may be of any preferred construction and are preferably mounted one on each side of the beams 9, substantially as illustrated in Fig. 1, wherein the beams are shown of different lengths and the shares or blades 12 are illustrated in different longitudinal and transverse planes in relation to the implement or in staggered order, and the blades may be secured upon the beams by bolts or other devices 33 in the usual manner.

The operation of the invention will be readily understood from the foregoing description, when taken in connection with the accompanying drawings and the following explanation thereof.

When it is desired to transport the implement to the field of operation, the operative parts are preferably raised into the position shown in Fig. 2, so that only the runners rest upon and are in contact with the soil; but when the implement is desired to be operated said parts will be lowered into the position shown in Fig. 1, whereupon as the implement is drawn over the soil the rotary arms or blades 27 will depress and hold down the weeds and other growth, so that the same can be prevented from choking the blades or shares 12 or from becoming entangled with the curved portion of the beams 9, it being understood that said arms or blades are rotated by contact with the surface over which the implement is being drawn, and the action of the blades or shares 12 is to reduce or pulverize the clods or upper portion of the soil, so that the same will be reduced to a fine condition, and thereby better retain the moisture.

This invention is not limited to the specific construction, combination, and arrangement of parts herein shown and described, and all changes in and modifications of the same as come within the spirit and scope of the invention are retained.

I claim—

1. An agricultural implement provided with skeleton runners constructed of a single piece of material bent upon itself and twisted parallel portions having the width thereof extending at right angles to each other and blades connected with said twisted portion of said runners.

2. An agricultural implement provided with skeleton runners constructed of a single piece of material bent upon itself and twisted so that the width of the parallel portions extend at right angles to each other, the end of the upper portion of each of said runners being serrated and blades having beams provided with serrated portions constructed to movably engage with the like portions of said runners and means for retaining said blades and runners at any angle in relation to each other.

3. An agricultural implement provided with skeleton runners, posts between the parts of the runners, bars connecting the runners, beams adjustably attached to the runners, blades carried by said beams, bars between the beams, plates, bearings thereon, shafts mounted in said bearings, and hubs on said shafts carrying arms constructed to be rotated by contact with the surface over which the implement is drawn.

4. An agricultural implement provided with skeleton runners, posts between the parts of the runners, bars connecting the runners, curved beams adjustably attached to the runners, blades carried by said beams, bars between the beam-plates, bearings thereon, shafts mounted on said bearings, hubs on said shafts carrying arms constructed to be rotated by contact with the surface over which the implement is drawn and a tubular draft-bar connected with said runners.

5. An agricultural implement provided with a supporting portion divided into sections having a guideway constructed with a slot, a bar mounted in said guideway of each section carrying an arm passing through said slot, said arms being pivotally connected to permit one section to be advanced or retreated.

6. An agricultural implement provided with sections of runners, a slotted guideway for each section, a bar mounted in each guideway carrying an arm working in the slot thereof, and movable connection between said arms to permit the movement of said sections in relation to each other.

In testimony whereof I have signed my name to this specification in the presence of two subscribing witnesses.

LEWIS C. PRESTON.

Witnesses:
J. W. KEMP,
L. B. ALDERETE.